United States Patent [19]
Guibard et al.

[11] Patent Number: 5,643,543
[45] Date of Patent: Jul. 1, 1997

[54] CATALYST FOR TREATMENT OF EXHAUST GASES FROM AN INTERNAL COMBUSTION ENGINE

[75] Inventors: Isabelle Guibard; Daniel Durand, both of Rueil Malmaison; Gil Mabilon, Carrieres sur Seine; Nicolas des Courtils, Garches, all of France

[73] Assignee: Institut Francais du Petrole, Rueil-Malmaison, France

[21] Appl. No.: 381,342

[22] Filed: Jan. 31, 1995

[30] Foreign Application Priority Data

Jan. 31, 1994 [FR] France .................. 94 01125

[51] Int. Cl.$^6$ .................................................. B01J 8/02
[52] U.S. Cl. .................. 423/213.5; 502/304; 502/325; 502/326
[58] Field of Search .................. 423/213.5; 502/304, 502/325, 326

[56] References Cited

U.S. PATENT DOCUMENTS

| | | | |
|---|---|---|---|
| 4,378,307 | 3/1983 | Brunelle et al. | 423/213.5 |
| 4,426,319 | 1/1984 | Blanchard et al. | 423/213.5 |
| 4,621,071 | 11/1986 | Blanchard et al. | 423/213.5 |
| 4,675,308 | 6/1987 | Wan et al. | 423/213.5 |
| 4,985,387 | 1/1991 | Prigent et al. | 423/213.5 |
| 5,015,617 | 5/1991 | Ohata et al. | 502/304 |
| 5,073,532 | 12/1991 | Domesle et al. | 502/304 |
| 5,120,695 | 6/1992 | Blumrich et al. | 502/304 |

FOREIGN PATENT DOCUMENTS

| | | |
|---|---|---|
| 0126676 | 11/1984 | European Pat. Off. . |
| 0170588 | 2/1986 | European Pat. Off. . |
| 0313434 | 4/1989 | European Pat. Off. . |
| 0559021 | 9/1993 | European Pat. Off. . |
| 32 23 500 | 12/1983 | Germany . |

*Primary Examiner*—Glenn A. Caldarola
*Assistant Examiner*—Walter D. Griffin
*Attorney, Agent, or Firm*—Millen, White, Zelano & Branigan, P.C.

[57] ABSTRACT

A catalyst for the treatment of exhaust gases from an internal combustion engine comprises a support including a porous layer which latter includes at least one inorganic refractory oxide and an active phase containing at least cerium, iron and platinum, characterized in that said porous layer comprises at least the following percentages by weight 0.3% to 4.4% of cerium;

0.1% to 3.5% of iron; and 0.0003% to 0.04% of platinum; and the complement to 100% being constituted by at least one inorganic refractory oxide.

The catalyst can be used in the treatment of exhaust gases from compression ignition engines, in particular from commercial vehicles with an unladen weight of 3.5 metric tons or more.

12 Claims, No Drawings

CATALYST FOR TREATMENT OF EXHAUST GASES FROM AN INTERNAL COMBUSTION ENGINE

BACKGROUND OF THE INVENTION

The present invention concerns a catalyst for the treatment of exhaust gases from an internal combustion engine, more particularly a compression ignition engine.

Such exhaust gases contain carbon monoxide, unburned hydrocarbons, nitrogen oxides and, in the case of compression ignition engines, particles, all of which are considered to be environmental pollutants.

Particles present in exhaust gases have a carbon skeleton (also known as soot) on which other compounds are adsorbed: high molecular weight hydrocarbons which constitute the so-called soluble fraction, sulfates, sulfuric acid, water vapor and various metallic compounds.

Pollutant emissions, more particularly particle emissions, depend greatly on the type of engine (spark ignition, compression ignition, direct injection, pre-chamber . . . ) and on its operating conditions (in particular the exhaust temperature).

In the case of compression ignition engines for light vehicles, exhaust gas temperatures during testing using a standard European cycle are relatively low at between 100° C. and 300° C., but for heavy vehicles (direct injection Diesel engines), they reach higher temperatures (up to 600° C.) at certain points in standard European cycle R 49. In addition, even in light vehicle engines operating under real conditions, exhaust temperatures can reach 600° C. to 700° C.

To limit these pollutant emissions, different means have been developed and installed in the exhaust system: catalysts which promote oxidation of carbon monoxide, unburned hydrocarbons and particles and, in certain cases, reduce the nitrogen oxides; and particle filters especially for use in compression ignition engines.

These catalysts are well known in the art and are generally formed from a monolithic ceramic or metal support on which a fine layer of one or more refractory oxides is deposited, generally alumina with a surface area and porosity considerably greater than in the monolithic substrate. The active metallic phase, composed essentially of platinum group metals (Pt, Rh, Pd, Os, Ru, Ir), is dispersed in this oxide.

These catalysts have to operate under severe conditions and they deactivate with time. A number of patents claim to limit this loss of activity, for example by adding other oxides such as rare earth oxides, alkali metal or alkaline-earth metal oxides to the catalyst.

In the case of spark ignition engines, European patent EP-B-0 027 069 describes the addition of cerium and iron to a catalyst constituted by platinum group metals deposited on an inorganic refractory oxide which increases thermal stability and resistance to ageing.

In the case of compression ignition engines, so-called oxidation catalysts reduce carbon monoxide, hydrocarbon and particle emissions. The catalyst types described in European applications EP-A-0 432 534, EP-A-0 462 593, EP-A-0 315 896 and EP-A-0 174 495, for example, include platinum group metals, more particularly platinum itself, deposited on an inorganic refractory oxide such as alumina, silica, aluminosilicates or titanium oxide. Other oxides can be added to promote certain reactions and increase thermal stability.

To reduce particle emission, filters can also be installed in the exhaust system. The use of catalytic filters means that regeneration can be carried out in situ, i.e., at lower temperatures than those required for combustion of soot in the absence of the catalytic phase. U.S. Pat. Nos. 4,849,339, 4,510,265 and 5,100,632 illustrate the state of the art as regards. As with oxidation catalysts, these devices generally comprise a refractory oxide layer on which one or more platinum group metals is deposited.

The catalysts described in the prior art, which reduce pollution from an internal combustion engine, generally contain concentrations of platinum and/or a platinum group metal of between 0.2 and 10 g of metals per liter of catalyst.

International Application WO 93/10886 describes oxidation catalysts used to treat exhaust gases, in particular from Diesel engines, comprising a support which is coated with a porous layer of cerium and alumina, the catalytic element which is deposited being platinum, in an amount of 0.1 to 5 g/cubic foot (about 3.53 to about 176.5 g/cm$^3$).

One of the objects of the invention is to improve the properties of these catalysts.

The high catalytic activity of noble metals, in particular platinum, in oxidation reactions means that carbon monoxide and hydrocarbon emissions can be considerably reduced, but has the drawback of flavoring oxidation of the sulfur dioxide present in the exhaust gases, particularly in the case of compression ignition engines. The sulfur trioxide $SO_3$ thus formed can either combine with water molecules to produce sulfuric acid which can condense on the particles or on the particle filter, or it can react with the catalyst support (alumina, titanium oxide, etc . . . ) to form sulfates which will decompose at high temperature and increase the particle emissions. Thus the consequence of these phenomena is an increase in the mass of particles emitted by the engine.

Catalytic formulations for depolluting internal combustion engines, in particular compression ignition engines, must also:

permit oxidation of the carbon monoxide, unburned hydrocarbons and particles under the engine operating conditions (i.e., at the lowest possible temperatures);

prevent sulfate and sulfite formation due to oxidation of sulfur dioxide; and be thermally stable and resist ageing.

SUMMARY OF THE INVENTION

We have found that, surprisingly, catalysts which contain both iron and cerium and small amounts of platinum have sufficient activity to oxidize carbon monoxide and hydrocarbons and limit the increase in the particle mass at high temperatures due to oxidation of sulfur dioxide.

The present invention thus concerns a catalyst comprising a support including a porous layer which latter includes at least one inorganic refractory oxide and an active phase containing at least cerium, iron and platinum. In accordance with the invention, the porous layer comprises at least the following percentages by weight:

0.3% to 4.4% of cerium;

0.1% to 3.5% of iron; and 0.0003% to 0.04% of platinum; and the complement to 100% being constituted by at least one inorganic refractory oxide.

Advantageously, the porous layer comprises, in percentages by weight:

0.3% to 4.4% of cerium;

0.5% to 2% of iron; and 0.0035% to 0.03% of platinum; and the complement to 100% being constituted by at least one inorganic refractory oxide.

Reducing the platinum content in these catalysts with respect to those of the prior art limits sulfur dioxide oxidation while retaining sufficient activity to oxidize the various pollutants.

The presence of cerium and iron, deposited together on the inorganic refractory oxide, reinforces the activity and stability of the catalyst over time and, surprisingly, limits sulfur dioxide oxidation.

Alumina spherules or extrudates are used as a support on which at least cerium, iron and platinum are deposited. In this instance, the composition of the support is the same as that indicated above for the porous layer.

These catalysts can also be deposited on various ceramic or metallic substrates. These substrates can be ceramic or metallic monoliths with a cellular structure (rolled or layered metallic strips). Other substrates can be used, such as monoliths composed of entangled or woven metal fibers, or foams constituted by silica fibers, or other inorganic refractory materials.

Catalysts deposited on these substrates can be prepared in a coating step during which the substrate is immersed in a suspension containing the constituents of the porous layer, then dried and calcined after removing the excess suspension. The metals are deposited in a second step, the impregnation step. In this step, the coated substrate is brought into contact with one or more solutions of active metal precursor (s). After any necessary draining, the coated and impregnated substrate is dried and heat treated.

In accordance with the invention, simultaneous or separate addition of the iron and cerium oxides, or their precursors, can be effected at different steps of the catalyst preparation. They can be introduced as solid pigments (oxides, hydroxides, carbonates, hydroxycarbonates, or insoluble salts) and/or as soluble precursors in the coating suspension, and/or pre-impregnated in one of the coating suspension constituents, and/or deposited on the porous layer before impregnation with platinum, and/or co-impregnated with the platinum.

The platinum precursors are those which are conventionally used for catalyst preparation, in particular chlorides, chlorine-containing complexes, nitrates, amine complexes, or acetylacetonates. Examples are hexachloroplatinic acid, platinum tetrammine chloride and dinitrodiammino platinum.

The inorganic refractory oxide is generally selected from the group formed by alpha alumina, gamma alumina, delta alumina, eta alumina, theta alumina, kappa alumina, khi alumina, silica, aluminosilicates, zeolites, titanium oxide, zirconia and their mixtures in any proportions. Oxides with large specific surface areas, in particular gamma alumina, are preferred.

The thermal stability of these oxides can be improved by incorporating a variety of compounds into the porous layer, either directly in the form of the oxide pigments, or in the form of oxide precursors.

The alumina in the porous layer is preferably an alumina with a specific surface area of more than 10 m²/g, for example 20 to 250 m²/g, and a pore volume of more than 0.05 cm³/g, eg 0.1 to 2 cm³/g.

When the catalyst support comprises a ceramic or metallic substrate, the quantity of porous layer comprising at least one inorganic refractory oxide is generally expressed with respect to the volume of the substrate and is between 20 and 200 g per liter of substrate (catalyst), preferably between 80 and 150 g/l.

The platinum content, per volume of catalyst (substrate) in liters, is preferably between 0.0007 and 0.08 g/l.

Catalysts of the invention exhibit improved performance in the following areas:

oxidation catalysis for the treatment of exhaust gases from compression ignition engines; and more particularly, oxidation catalysis for the treatment of exhaust gases from commercial vehicles with a total unladen weight of 3.5 metric tons or more. The following examples illustrate the invention.

EXAMPLES

EXAMPLE 1

Iron and cerium were deposited on gamma alumina by impregnating 700 g alumina with a solution of cerous nitrate and ferric nitrate. This solution contained the equivalent of 40 g of cerium oxide ($CeO_2$) and 13 g of iron oxide ($Fe_2O_3$).

The impregnated alumina was then dried at 150° C., calcined for 3 hours at 500° C., then ground.

A coating suspension was prepared from 2 liters of deionized water containing 12 g of nitric acid, 600 g of gamma alumina which had been impregnated with iron and cerium and 95 g of pseudo-boehmite, 72% dry matter. This suspension was ground until the particle size was below 10 microns.

In a first step, the coating step, a 0.84 liter ceramic monolith (cordierite) containing 62 cells per $cm^2$ was immersed in the suspension then drained, the excess suspension being eliminated by blowing. The support was dried then calcined in a furnace at a temperature of 600° C. for 2 hours. These immersion, blowing and calcining steps were carried out a second time to deposit the equivalent of 120 g of porous layer per liter of catalyst (substrate).

In a second step, the impregnation step, the coated monolith was immersed in a platinum solution to produce a quantity of fixed platinum, after drying and calcination at 500° C. for 2 hours, of 0.035 g per liter of catalyst.

The porous catalyst layer (C1) contained 4.09% by weight of cerium, 1.13% by weight of iron and 0.029% by weight of platinum.

EXAMPLE 2

Seven identical ceramic monoliths were coated using the procedure described in Example 1. In a second step, six of these monoliths, coated with a porous layer containing 4.09% of cerium and 1.13% of iron, were impregnated with platinum salt solutions to produce catalysts with platinum contents of between 0.018 and 2.8 g per liter of catalyst (catalysts C2, C3, C4, C5, C6 and C7). The platinum contents expressed with respect to the amount of porous layer deposited, were between 0.015% and 2.33%.

One of the seven coated monoliths was not impregnated with platinum solution (catalyst C8).

The composition of these catalysts is shown in the table below. The cerium and iron contents are expressed as the percentage by weight with respect to the porous layer weight; the platinum content is expressed both as the percentage by weight with respect to the porous layer and by the quantity of metal in grams with respect to the monolith volume.

| Reference | Ce content (%) | Fe content (%) | Pt content (%) | Pt content (%) |
|---|---|---|---|---|
| C1 | 4.09 | 1.13 | 0.029 | 0.035 |
| C2 | 4.09 | 1.13 | 0.015 | 0.018 |
| C3 | 4.09 | 1.13 | 0.058 | 0.07 |
| C4 | 4.09 | 1.13 | 0.145 | 0.175 |
| C5 | 4.09 | 1.13 | 0.29 | 0.35 |
| C6 | 4.09 | 1.13 | 1.175 | 1.41 |
| C7 | 4.09 | 1.13 | 2.33 | 2.8 |
| C8 | 4.09 | 1.13 | 0 | 0 |

EXAMPLE 3

Laboratory evaluation of catalysts

Cylinders of 2.5 cm diameter and 6 cm length were cut out from the prepared catalysts (references C1 to C8), in the longitudinal direction of the channels. The volume was thus about 30 cm$^3$.

These samples were tested in a laboratory to determine their behavior with regard to oxidation of carbon monoxide, propylene and sulfur dioxide. A gaseous mixture containing, apart from the three compounds, nitric oxide, water vapor and oxygen diluted in nitrogen, was passed over the catalyst. The composition by volume of the mixture was as follows:

CO: 300 ppm
NO: 200 ppm
$C_3H_6$: 100 ppm (methane equivalent)
$H_2O$ (vapor): 6%
$SO_2$: 20 ppm
$O_2$: 10%
$N_2$: complement The hourly flow rate of the gases was 50,000 times greater than the substrate volume (VVH=50,000 h$^{-1}$).

While the temperature was raised, the conversion of each of the three pollutant components was measured. The concentration at the input and output of the catalyst was determined using infra red analysis for carbon monoxide, a flame ionization detector for propylene and by ultra violet fluorescence for the sulfur dioxide.

Table 1 shows the semi-conversion temperatures ($T_{50}$, the temperature at which 50% conversion was observed) and the conversion rates at 450° C. of CO, $C_3H_6$ and $SO_2$.

The conversion rates are expressed as the difference between the upstream and downstream concentrations as a ratio of the concentration upstream of the catalyst.

TABLE 1

| | Pt content (g/l) | Semi-conversion temperature (°C.) | | | Conversion at 450° C. (%) | | |
|---|---|---|---|---|---|---|---|
| | | CO | C3H6 | SO2 | CO | C3H6 | SO2 |
| C1 | 0.035 | 335 | 352 | — | 96 | 95 | 28 |
| C2 | 0.018 | 430 | 460 | — | 60 | 46 | 20 |
| C3(*) | 0.07 | 288 | 302 | 445 | 99 | 97 | 52 |
| C4(*) | 0.175 | 235 | 260 | 350 | 100 | 98 | 77 |
| C5(*) | 0.35 | 195 | 223 | 226 | 100 | 100 | 98 |
| C6(*) | 1.41 | 142 | 172 | 172 | 100 | 100 | 100 |
| C7(*) | 2.8 | 140 | 154 | 154 | 100 | 100 | 100 |
| C8(*) | 0 | — | 550 | — | 9 | 15 | 10 |

(*) comparison

These results show the advantage of catalysts prepared in accordance with the invention (catalysts C1, C2) with low metal contents which limit $SO_2$ oxidation at high temperature and retain high CO and propylene oxidation activity.

EXAMPLE 4

A new suspension was prepared by mixing 600 g of gamma alumina, 100 g of pseudo-boehmite alumina and 15 g of nitric acid in 2 liters of deionized water.

A 0.84 liter ceramic monolith was coated with this suspension to deposit 150 g per liter of porous layer.

The coated monolith was then impregnated with a solution containing cerous nitrate and ferric nitrate corresponding to 2.5 g of cerium oxide ($CeO_2$) and 2.8 g of iron oxide ($Fe_2O_3$). It was then dried at 150° C. and calcined at 500° C. for 2 hours.

The monolith was then impregnated with a platinum solution to deposit 0.035 g of platinum per liter of catalyst.

The porous layer of this catalyst (C9) contained 1.55 % by weight of cerium, 1.49% by weight of iron and 0.022 % by weight of platinum.

EXAMPLE 5 (comparative)

A 0.84 liter ceramic monolith was coated with an alumina suspension prepared as described in Example 4 to deposit 150 g per liter of alumina.

The monolith was then impregnated with a solution containing ferric nitrate corresponding to 2 g of iron oxide ($Fe_2O_3$). Following drying and calcining at 500° C. for 2 hours, platinum impregnation was carried out to deposit 0.035 g per liter of catalyst.

The porous layer of this catalyst (C10) contained 1.09% by weight of iron and 0.022% by weight of platinum.

EXAMPLE 6 (comparative)

A catalyst was prepared following the procedure described in Example 4, with the exception that the alumina coated monolith was impregnated with a solution of cerous nitrate corresponding to 6.5 g of cerium oxide ($CeO_2$) then, following calcination, by a platinum solution.

The platinum content was 0.035 g per liter of catalyst.

The porous layer of this catalyst (C11) contained 4% by weight of cerium and 0.022% by weight of platinum.

EXAMPLE 7 (comparative)

A 0.84 liter ceramic monolith was coated with alumina using the procedure described in Example 4, without depositing either iron or cerium. 150 g per liter of alumina was deposited.

This monolith was then impregnated with a platinum solution to deposit 0.035 g of platinum per liter of catalyst (C12), i.e., 0.022% by weight of platinum.

EXAMPLE 8

Laboratory evaluation of catalysts

The evaluation procedure of Example 3 was used to compare catalysts C1, C9, C10, C11 and C12 which had differing porous layer compositions.

The results of these tests are shown in Table 2, and illustrate that there is a synergistic effect between the iron and the cerium which improves the high temperature conversion rate of carbon monoxide and propylene while the conversion rate of $SO_2$ to $SO_3$ remained relatively low.

TABLE 2

| Catalyst | Ce content (%) | Fe content (%) | Pt content (g/l) | Semi-conversion temperature (°C) | | | Conversion at 450° C. (%) | | |
|---|---|---|---|---|---|---|---|---|---|
| | | | | CO | C3H6 | SO2 | CO | C3H6 | SO2 |
| C1 | 4.09 | 1.13 | 0.035 | 335 | 352 | — | 96 | 95 | 28 |
| C9 | 1.55 | 1.49 | 0.035 | 341 | 360 | — | 93 | 93 | 30 |
| C10(*) | 0 | 1.09 | 0.035 | 352 | 362 | | 87 | 91 | 38 |
| C11(*) | 4 | 0 | 0.035 | 345 | 367 | 445 | 90 | 88 | 53 |
| C12(*) | 0 | 0 | 0.035 | 354 | 368 | | 86 | 87 | 35 |

(*) comparison

EXAMPLE 9

Catalyst evaluation after ageing

A portion of the catalysts tested in Examples 3 and 8 were treated at 600° C. in air in the presence of water vapor (6% by volume) and $SO_2$ (20 ppm by volume) for 20 hours, to simulate ageing.

These catalysts were given references C1-V, C6-V, C10-V, C11-V and C12-V. The test procedure used in Examples 3 and 8 were used to compare the catalytic performances.

Table 3 shows the results obtained with these aged catalysts. The original values for each catalyst are shown in brackets. This analysis shows that the catalyst containing iron, cerium and a little platinum exhibited a reduced loss in CO and $C_3H_6$ oxidation activity. Again, then, the presence of the iron and cerium limits sulfur dioxide oxidation.

EXAMPLE 11 (comparative)

Example 10 was repeated using three other metallic monoliths, the only exception being that the platinum content of the catalysts was: 0.07 g per liter (M2), 0.35 g/l (M3) and 1.41 g/l, i.e., 0.058, 0.29 and 1.174% by weight of platinum respectively, with respect to the porous layer.

EXAMPLE 12

A monolith which allowed radial gas flow was obtained by forming a fibrous sponge into a hollow cylinder (annular cross section, internal diameter=54 mm, external diameter= 141 mm, length=172 mm). The monolith was preoxidized in air at 900° C. for 6 hours then coated with a suspension containing 2500 g of gamma alumina which had previously been impregnated with the equivalent of 4.2% by weight of

TABLE 3

| Catalyst | Ce content (%) | Fe content (%) | Pt content (g/l) | Semi-conversion temperature (°C) | | | Conversion at 450° C. (%) | | |
|---|---|---|---|---|---|---|---|---|---|
| | | | | CO | C3H6 | SO2 | CO | C3H6 | SO2 |
| C1-V | 4.09 | 1.13 | 0.035 | 378 (335) | 390 (352) | | 95 (96) | 93 (95) | 23 (28) |
| C6-V(*) | 4.09 | 1.13 | 1.41 | 180 (142) | 202 (172) | 205 (172) | 100 (100) | 95 (100) | 95 (100) |
| C10-V(*) | 0 | 1.09 | 0.035 | 402 (352) | 406 (362) | | 84 (87) | 88 (91) | 34 (38) |
| C11-V(*) | 4 | 0 | 0.035 | 390 (345) | 407 (367) | 480 (445) | 87 (90) | 85 (88) | 47 (53) |
| C12-V(*) | 0 | 0 | 0.035 | 402 (354) | 416 (368) | | 81 (86) | 80 (87) | 30 (35) |

( ) original value
(*) comparison

EXAMPLE 10

A 2.3 liter monolith (d=140 mm, L=150 mm) formed by rolling a metallic strip, and containing 62 cells per cm², was preoxidized in air at 950° C. for 6 hours then immersed at room temperature in 8 liters of a suspension containing the equivalents of 3100 g of alumina, 160 g of cerium oxide ($CeO_2$), 50 g of iron oxide ($Fe_2O_3$) and 100 g of nitric acid. The suspension was prepared using the same procedure as that used in Example 1. The monolith was then drained and blown. It was then calcined in a furnace at 600° C. for 2 hours. These steps were carried out a second time to deposit the equivalent of 120 g of porous layer per liter of monolith (substrate).

0.035 g of platinum per liter of catalyst was impregnated into the porous layer using a solution containing a platinum salt. The porous layer of this catalyst (M1) contained 3.9% by weight of cerium, 1.05% by weight of iron and 0.029% by weight of platinum.

cerium and 1.6% by weight of iron. After calcining at 600° C. for 2 hours, the porous layer contained 115 g per liter of catalyst.

The monolith was impregnated with a platinum salt solution to a metal content of 0.02 grams per liter of catalyst, i.e., 0.017% by weight with respect to the porous layer.

This fibrillar catalyst (F1) was compared with the catalysts prepared on a metallic monolith.

EXAMPLE 13 (comparative)

Three metallic monoliths identical to those used in Examples 10 and 11 were coated with a suspension containing unimpregnated alumina. Each monolith contained 120 grams per liter of porous layer.

A first coated monolith was impregnated with ferric nitrate solution to produce a coating containing 1.2% of iron (M5).

A second alumina coated monolith was impregnated with a cerous nitrate solution to produce a cerium content of 4% by weight in the porous layer (M6).

The two monoliths M5 and M6, and the third monolith (M7) coated with alumina alone, were impregnated with a platinum solution to deposit 0.035 g of platinum per liter of catalyst in each catalyst (i.e., 0.029% by weight with respect to the porous layer).

EXAMPLE 14

Catalyst evaluation using a test bench

Catalysts M1 to M7 and F1 were tested on an engine test bench with a commercial vehicle direct injection engine (cylinder capacity 2500 cm$^3$: power: 85 kW) using a gas oil containing 500 ppm of sulfur. This engine emitted so-called dry particles, i.e., particles in which the fraction which is soluble in dichloromethane is low (25% to 35% by weight of particle mass).

The catalysts were mounted in a metal envelope and installed in the exhaust system about 1 m from the engine.

The catalysts were evaluated by determining pollutant conversion rates at high temperature and at different engine speeds. The selected points corresponded to modes 6 and 8 of the 13 mode cycle used in the European procedure (cycle ECE R 49). The temperatures at the catalyzer inlet for the two points were 450° C. and 550° C. and the hourly space velocities were very high: 110,000 h$^{-1}$ and 180,000 h$^{-1}$.

Pollutant emissions were determined by infra-red analysis for carbon monoxide and a flame ionization detector for hydrocarbons. Particle emission was determined by weighing the particles recovered from a filter using a standard procedure.

The results obtained are shown in Table 4. They demonstrate that the catalysts of the invention reduce particle emissions even at high temperatures, while the use of a prior art catalyst increases emissions (negative conversion).

CO and hydrocarbon conversions, however, remained high despite a reduction in the platinum content, especially when the catalysts also contained iron and cerium.

The results obtained using a commercial vehicle engine show the beneficial effect of the simultaneous presence of iron and cerium in a catalyst containing low quantities of platinum on elimination of the three pollutants under consideration.

EXAMPLE 15

A ceramic monolith with a volume of 8 liters and 62 cells per cm$^2$ was immersed in a suspension to deposit 150 g of porous layer per liter of catalyst in a number of steps. This porous layer contained 94% by weight of alumina, 4% of cerium and 2% of iron.

The coated monolith (C13) was brought into contact with a platinum salt solution to deposit 0.040 g of metal per liter of catalyst (i.e., 0.033% by weight with respect to the porous layer).

EXAMPLE 16 (comparative)

Three ceramic monoliths each with a volume of 8 liters identical to that above were coated as described in Example 15, then impregnated with different solutions of platinum to deposit 0.022 g (C14), 0.35 g (C15) and 1.75 g (C16) of platinum per liter of catalyst, i.e., 0.018%, 0.29% and 1.46% by weight with respect to the porous layer.

EXAMPLE 17

Catalyst evaluation using a test bench

Catalysts C13 to C16 were tested on an engine test bench using the procedure described in Example 14 but with a heavy goods vehicle direct injection engine (cylinder capacity: 10 liters, power: 250 kW) producing so-called wet particles (fraction soluble in dichloromethane >50% of weight of particles).

Table 5 shows the results obtained with this series of catalysts. The catalysts were evaluated by comparing CO, hydrocarbon and particle conversions measured at the selected two operating points. In order to estimate the activity of the catalyst in oxidizing sulfur dioxide, the fraction of sulfates present in the particles was determined by extraction in an aqueous medium.

TABLE 4

| Catalyst | Ce content (%) | Fe content (%) | Pt content (g/l) | Conversion at 450° C. (%) 2000 rpm - VVH = 110000 h$^{-1}$ | | | Conversion at 550° C. (%) 3700 rpm - VVH = 180000 h$^{-1}$ | | |
|---|---|---|---|---|---|---|---|---|---|
| | | | | CO | C3H6 | Particles | CO | C3H6 | Particles |
| M1 | 3.9 | 1.05 | 0.035 | 71 | 58 | 15 | 83 | 43 | 17 |
| M2(*) | 3.9 | 1.05 | 0.07 | 78 | 66 | 2 | 85 | 46 | -4 |
| M3(*) | 3.9 | 1.05 | 0.35 | 85 | 70 | -11 | 87 | 51 | -19 |
| M4(*) | 3.9 | 1.05 | 1.41 | 88 | 72 | -15 | 91 | 55 | -24 |
| M5(*) | 0 | 1.2 | 0.035 | 64 | 55 | 7 | 78 | 40 | 8 |
| M6(*) | 4 | 0 | 0.035 | 66 | 54 | 8 | 79 | 41 | 8 |
| M7(*) | 0 | 0 | 0.035 | 62 | 51 | 5 | 75 | 39 | 6 |
| F1 | 4.2 | 1.6 | 0.02 | 65 | 53 | 19 | 78 | 36 | 18 |

(*) comparison

TABLE 5

| Catalyst | Ce content (%) | Fe content (%) | Pt content (g/l) | T° C. = 450° C. 1200 rpm VVH = 110000 h-1 | | | | T° C. = 550° C. 2000 rpm VVH = 180000 h-1 | | | |
|---|---|---|---|---|---|---|---|---|---|---|---|
| | | | | Conversion % | | | Sulphates on particles (%) | Conversion % | | | Sulphates on particles (%) |
| | | | | CO | C3H6 | Particles | | CO | C3H6 | Particles | |
| C13 | 4 | 2 | 0.04 | 35 | 37 | 45 | 2.00 | 24 | 35 | 28 | 1.5 |
| C14 | 4 | 2 | 0.022 | 28 | 32 | 38 | 1.30 | 19 | 26 | 25 | 0.5 |
| C15(*) | 4 | 2 | 0.35 | 67 | 72 | 98 | 22.00 | 58 | 63 | 82– | 21 |
| C16(*) | 4 | 2 | 1.75 | 88 | 91 | 145 | 26.00 | 72 | 76 | –115 | 24 |

(*) comparison

With the catalysts of the invention, the particle conversion rates were higher than those obtained in Example 14 using a smaller cylindrical capacity engine. This was due to the higher soluble fraction of particles (more than 50% by weight) than in Example 14, this fraction being easier to oxidize.

The prior art catalysts showed negative particle conversion rates due to an increase in the mass of the particles. This phenomenon is due to formation of sulfur by oxidation of sulfur dioxide.

The conversion rates for the other pollutants were lower with the catalysts containing less platinum, but remained at a sufficiently high level to satisfy pollutant emission standards.

These examples show the advantages of the catalysts of the invention, containing iron, cerium and small amounts of platinum, which limit sulfate formation at high temperature by limiting the oxidation of sulfur dioxide, also oxidize a portion of the particles without substantially decreasing carbon monoxide and hydrocarbon (propylene in this instance) oxidation activity.

We claim:

1. A method for the treatment of exhaust gases, comprising contacting exhaust gases from a compression ignition engine with a catalyst comprising a support including a porous layer of at least one inorganic refractory oxide and an active phase containing at least cerium, iron and platinum, wherein said porous layer comprises at least the following percentages by weight:

0.3% to 4.4% of cerium;

0.1% to 3.5% of iron; and 0.0003% to less than 0.04% of platinum, and the complement to 100% being at least one inorganic refractory oxide.

2. A method for the treatment of exhaust gases from compression ignition engines, comprising contacting said gases with a catalyst for the treatment of exhaust gases from an internal combustion engine, said catalyst comprising a support including a porous layer of at least one inorganic refractory oxide and an active phase containing at least cerium, iron and platinum, wherein said porous layer comprises at least the following percentages by weight:

0.3% to 4.4% of cerium;

0.1% to 3.5% of iron; and 0.0003% to 0.04% of platinum; and the complement to 100% being at least one inorganic refractory oxide.

3. A method according to claim 2, wherein said porous layer comprises, by weight:

0.3% to 4.4% of cerium;

0.1% to 2% of iron; and 0.0035% to 0.03% of platinum; and the complement to 100% being at least one inorganic refractory oxide.

4. A method according to claim 2, wherein the inorganic refractory oxide is alpha alumina, gamma alumina, delta alumina, eta alumina, theta alumina, kappa alumina, khi alumina, silica, an aliminosilicate, azeolite, titanium oxide, zirconia or a mixture thereof.

5. A method according to claim 2, wherein the porous layer is in particulate form.

6. A method according to claim 2, wherein the porous layer is deposited on a metallic or ceramic substrate.

7. A method according to claim 6, wherein said substrate is monolithic with a cellular structure.

8. A method according to claim 6, wherein said porous layer is present in a quantity of 20 to 200 g/l of said substrate.

9. A method according to claim 6, wherein the platinum content, expressed with respect to the total volume of said substrate, is between 0.0007 and 0.08 g/l.

10. A method according to claim 2, wherein the exhaust gases are from commercial vehicle compression ignition engines with a total unladen weight of 3.5 metric tons or more.

11. A method according to claim 6, wherein said porous layer is present in a quantity of 80 to 150 g/l of said substrate.

12. A method according to claim 5, wherein the porous layer is spherules or extrudates.

* * * * *